(12) United States Patent
Delpic

(10) Patent No.: US 10,614,104 B2
(45) Date of Patent: Apr. 7, 2020

(54) PROCESSING OF DATA RELATING TO ENTITIES

(71) Applicant: Orange, Paris (FR)

(72) Inventor: Sebastien Delpic, Caen (FR)

(73) Assignee: ORANGE, Paris (FR)

( * ) Notice: Subject to any disclaimer, the term of this patent is extended or adjusted under 35 U.S.C. 154(b) by 566 days.

(21) Appl. No.: 14/555,148

(22) Filed: Nov. 26, 2014

(65) Prior Publication Data

US 2015/0149464 A1    May 28, 2015

(30) Foreign Application Priority Data

Nov. 26, 2013 (FR) ...................................... 13 61639

(51) Int. Cl.
*G06F 17/30* (2006.01)
*G06F 16/28* (2019.01)
(Continued)

(52) U.S. Cl.
CPC .......... *G06F 16/288* (2019.01); *G06F 16/287* (2019.01); *G06F 16/44* (2019.01);
(Continued)

(58) Field of Classification Search
CPC ......... G06F 17/30775; G06F 17/30058; G06F 17/30604; G06F 17/30994;
(Continued)

(56) References Cited

U.S. PATENT DOCUMENTS 5,233,513 A * 8/1993 Doyle ....................... G06F 8/30
705/1.1
5,980,096 A * 11/1999 Thalhammer-Reyero ...................
G05B 17/02
(Continued)

FOREIGN PATENT DOCUMENTS

EP     1962207 A1     8/2008
EP     2466443 A1     6/2012

OTHER PUBLICATIONS

French Search Report and Written Opinion dated Oct. 16, 2014 for corresponding French Patent Application No. 1361639, filed Nov. 26, 2013.
(Continued)

*Primary Examiner* — Shiow-Jy Fan
(74) *Attorney, Agent, or Firm* — David D. Brush; Westman, Champlin & Koehler, P.A.

(57) ABSTRACT

A method is provided for data processing, which includes generating a signal for control of display on a screen of a graphical interface including a graph composed of links and of nodes demarcated by vignettes, each vignette representing an entity. The graph contains a first vignette representing a first entity. The method selects a set of entities as a function of at least one second criterion, from among a plurality of entities meeting a first selection criterion in relation to the first entity. The first vignette of the graph is linked in the graph directly to one or more second vignettes, each representing a second entity of the set of entities. The number of second vignettes is dependent on a current threshold value (Continued)

determined on the basis of the plurality of entity. Also provided is a device implementing respectively a method of processing.

17 Claims, 9 Drawing Sheets

(51) Int. Cl.
    *G06F 16/904*     (2019.01)
    *G06F 16/64*     (2019.01)
    *G06F 16/44*     (2019.01)
    *G06F 16/74*     (2019.01)

(52) U.S. Cl.
    CPC ............ *G06F 16/64* (2019.01); *G06F 16/743* (2019.01); *G06F 16/904* (2019.01)

(58) Field of Classification Search
    CPC ......... G06F 17/30601; G06F 17/30849; G06F 16/64; G06F 16/904; G06F 16/287; G06F 16/44; G06F 16/288; G06F 16/743
    USPC .......................................... 707/748, 737, 724
    See application file for complete search history.

(56) References Cited

U.S. PATENT DOCUMENTS

| | | | |
|---|---|---|---|
| 6,285,367 B1 | 9/2001 | Abrams et al. | |
| 7,549,309 B2* | 6/2009 | Beringer | G06F 17/30991 |
| | | | 345/619 |
| 8,051,084 B2* | 11/2011 | Tunkelang | G06F 16/245 |
| | | | 707/737 |
| 8,156,121 B2* | 4/2012 | Reese | G06F 3/0481 |
| | | | 707/736 |
| 8,997,084 B2* | 3/2015 | Marndi | G06F 8/65 |
| | | | 717/168 |
| 9,471,606 B1* | 10/2016 | Pedregal | G06F 17/30386 |
| 9,600,142 B2* | 3/2017 | Assadollahi | G06F 3/0482 |
| 9,798,829 B1* | 10/2017 | Baisley | G06F 17/30958 |
| 2005/0065942 A1* | 3/2005 | Diab | G06F 8/24 |
| 2005/0114802 A1* | 5/2005 | Beringer | G06F 17/30991 |
| | | | 715/700 |
| 2005/0222828 A1* | 10/2005 | Dzhafarov | G06K 9/6215 |
| | | | 703/2 |
| 2006/0004698 A1* | 1/2006 | Pyhalammi | G06F 17/30058 |
| 2007/0247767 A1* | 10/2007 | Zhang | H02H 1/0015 |
| | | | 361/42 |
| 2007/0300190 A1* | 12/2007 | Bier | G06F 17/278 |
| | | | 715/862 |
| 2008/0034306 A1* | 2/2008 | Ording | G06F 3/04817 |
| | | | 715/764 |
| 2008/0077875 A1 | 3/2008 | Li et al. | |
| 2008/0104127 A1* | 5/2008 | Billmaier | G06F 17/30029 |
| 2008/0301181 A1* | 12/2008 | Lori | G06F 16/288 |
| 2010/0106752 A1* | 4/2010 | Eckardt, III | G06F 17/30696 |
| | | | 707/805 |
| 2010/0114897 A1* | 5/2010 | Polo-Malouvier | ............ |
| | | | G06F 17/30592 |
| | | | 707/741 |
| 2011/0153528 A1* | 6/2011 | Bailey | G06Q 30/02 |
| | | | 706/12 |
| 2012/0105453 A1* | 5/2012 | Cardno | G06F 17/30994 |
| | | | 345/440 |
| 2013/0074007 A1* | 3/2013 | Assadollahi | G06F 3/0482 |
| | | | 715/810 |
| 2013/0111406 A1* | 5/2013 | Gebhart | G06F 3/0487 |
| | | | 715/823 |
| 2014/0115001 A1* | 4/2014 | Arroyo | G06F 17/30967 |
| | | | 707/772 |
| 2014/0207769 A1* | 7/2014 | Marbach | G06Q 10/04 |
| | | | 707/723 |
| 2014/0280044 A1* | 9/2014 | Huynh | G06F 17/30477 |
| | | | 707/722 |
| 2015/0112818 A1* | 4/2015 | Lombriser | G06Q 30/0277 |
| | | | 705/14.73 |

OTHER PUBLICATIONS

TuneGlue: Relationship Explorer. Last FM & Amazon, n.d. Web. <audiomap.tuneglue.net>. Screenshots from Oct. 2, 2015.

* cited by examiner

| C1 | CT1 | CM1 |
|----|-----|-----|
| C2 | CT2 | CM2 |
| ... | ... | ... |
| Ci | CTi | CMi |
| ... | ... | ... |

PROCESSING OF DATA RELATING TO ENTITIES

CROSS-REFERENCE TO RELATED APPLICATIONS

This Application claims priority under 35 U.S.C. § 119 from French Application FR 13 61639, filed Nov. 26, 2013, the content of which is incorporated herein by reference in its entirety.

FIELD OF THE DISCLOSURE

The present disclosure relates to searching for entities from among a plurality of entities as a function of criteria that are predefined so as for example to obtain data associated with entities.

Such entities are, by way of example and without any limitation, people, for example artists, singers, etc., names of files, contents, etc.

Data associated with an entity are for example multimedia contents, audio and/or video contents, textual contents, contacts of an address book, data files, instructions of a computing program (for the execution of an application, of a game, or the like), etc.

Such a computing device may typically be, by way of example, a viewing apparatus endowed with tactile functionalities such as a PC screen, a PC tablet, a mobile telephone, or the like. Moreover, the device might not include any screen intended for the display of the interface. Such may be the case for example for a terminal of Set-Top-Box type, connected on the other hand to a screen, for example of a television set, able to display a graphical interface at the disposal of a user, who can actuate for example buttons of a remote control.

The result of the search is presented to a user in the form of a graphical interface displayed on a screen of a computing device.

The implementation of an interface on a screen then consists in displaying vignettes corresponding respectively to entities. "Vignette" is intended to mean any possible representation of an entity, such as for example and non-limitingly an imagette representative of a person (photo, name), of an audio and/or video content (album cover, film poster, or the like), an icon of a program, a logo, an arbitrary shape containing text, etc.

BACKGROUND OF THE DISCLOSURE

The product TuneGlue (http://audiomap.tuneglue.net/) discloses the display of a plurality of vignettes. A central vignette represents an original artist and the other vignettes represent artists/songs related to this original artist.

More precisely, this Web site allows, subsequent to the inputting by a user by means of a graphical interface of an artist name, the display of five vignettes representing respectively artists close to the artist chosen by the user. These vignettes are linked directly to the chosen artist.

An additional function makes it possible to select one of the displayed vignettes and this selection causes the additional display of five vignettes representing artists close to the artist associated with the selected vignette. These vignettes are linked directly to the artist whose vignette has been selected.

The operation can thereafter be repeated one or more times for one or more other artists.

The procedure requires the user to click successively on the vignette representing each artist so as to have the complete map.

Moreover, the number of artists displayed in conjunction with a selected artist is pegged.

SUMMARY

An aspect of the present disclosure pertains to a method of data processing, implemented by a computing device comprising a step of generating a signal for control of display on a screen of a graphical interface comprising a graph composed of links and of nodes demarcated by vignettes, each vignette representing an entity, said graph contains a first vignette representing a first entity, a step of selecting a set of entities as a function of at least one second selection criterion, from among a plurality of entities meeting a first selection criterion in relation to the first entity, the first vignette of said graph is linked in said graph directly to one or more second vignettes each representing a second entity of said set of entities, wherein the second selection criterion is determined from characteristics of the plurality of entities meeting the first criterion, the number of said second vignettes being dependent on the second criterion.

The number of said second vignettes being dependent on a current threshold value determined on the basis of the plurality of entities.

The second selection criterion depend on a current threshold value determined on the basis of the plurality of entities.

A threshold value is determined as a function of a plurality of entities meeting a first selection criterion in relation to a first entity.

Thus, the number of second vignettes displayed varies as a function of the first entity and of the first criterion.

According to a particular embodiment of the method, said graph contains a plurality of vignettes distributed over two levels, the first vignette belonging to a first level and the second vignettes being distributed over a second level, and the method furthermore comprises the selection of N sets of entities, N being greater than or equal to one, the selection of a second set of entities being performed as a function of said at least one second criterion, from among entities of at least one group of entities, the entities of a said group of entities meeting said at least one first selection criterion in relation to an entity of said set, the selection of a Kth set of entities (k>2) is performed as a function of said at least one second criterion, from among entities of at least one group of entities, the entities of a said group of entities meeting said at least one first selection criterion in relation to an entity of the (K−1)th set, a vignette of the level (k−1) of said graph is linked in said graph directly to one or more vignettes of level K each representing an entity of said Kth set of entities, the number of said vignettes of level K being dependent on said threshold value.

This allows the obtaining of a complete map without the necessity for successive selections on the part of the user.

The method thus allows the display of a different number of vignettes from one level to the other.

According to a particular embodiment of the method of processing, the selection of a Kth set furthermore comprises a test step to determine whether the sum of the number NV of vignettes of order strictly less than K of said graph and of the number NK of entities of the Kth set is greater than a predefined maximum value NVM, and in the case where said sum is greater than said maximum value NVM, a step of determining a reduced set of entities comprising (NBM-NV) entities selected from among the NK entities of the Kth set, each vignette of level K representing an entity of said reduced set.

Limiting the number of vignettes displayed makes it possible to avoid the overlapping of displayed vignettes and to obtain an interface readable by a user.

The number of levels thus depends on the number of vignettes displayed for each level of representation.

Alone, the number of vignettes displayed for the last level is optionally reduced.

According to a particular embodiment of the method of data processing, said current threshold value is a value of a predefined quantity, at least one value of said quantity is associated with at least one entity and said at least one second criterion is a criterion of comparison between a value of said quantity associated with an entity and said current threshold value.

According to a particular embodiment of the method of data processing, the current threshold value is selected from among several threshold values determined as a function of said plurality of entity.

This allows the obtaining of several graphs for one and the same first entity.

According to a particular embodiment of the method of data processing, the graphical interface contains an icon comprising at least two areas selectable by a user, each area being associated with a threshold value, and subsequent to the selection by the user of one of said at least two areas of the icon, the current threshold value VSC is the threshold value associated with the selected area.

The display of selectable areas is a simple means for the user to choose one of the threshold values.

According to a particular embodiment of the method of data processing, the step of selecting said area is followed by a step of displaying a modified graph containing a modified number of said second vignettes.

As a function of the area selected by the user, the number of vignettes displayed for each level will be different. The user will thus be able to navigate by a graph comprising a significant number of vignettes displayed per level and a limited number of levels and a graph comprising a lower number of vignettes for each level and a more significant number of levels.

According to a particular embodiment of the method of data processing, the number of areas and the threshold value associated with each area are determined on the basis of said plurality.

This makes it possible to obtain a number of areas and values of areas suited to the first entity or first entities considered and more particularly to the search for entities performed by a user. This makes it possible to prevent a user obtaining graphs containing levels of representation not containing any entities and prevents him inputting several threshold values before obtaining a graph suited to his search. Thus, the obtaining of a graph is facilitated.

According to a particular characteristic of the method of data processing, a plurality of classes being predefined for a predefined quantity, a rank being associated with each class, each entity of the plurality of entities is associated with one of the classes as a function of the value of the quantity associated with said entity and the number of levels of precision depends on the highest rank from among the ranks of the classes for which at least one entity has been associated.

According to a particular embodiment of the method of data processing, the number of areas is the number of classes for which at least one entity of the plurality has been associated.

According to a particular embodiment of the method of data processing, the graph comprises at least two first vignettes each representing a first entity and the method comprises a step of obtaining a set of entities of rank 1 which are selected as a function of said at least one second selection criterion from among entities of at least two groups of entities, the entities of a said group meeting said at least one first selection criterion in relation to one of the first entities, each first vignette of said graph is linked in said graph directly to one or more second vignettes each representing an entity of said set of entities of rank 1, the number of said second vignettes being dependent on a threshold value determined on the basis of entities of said at least two groups of entities.

According to a particular embodiment of the method of data processing, the graph contains two first entities and a first of the two first entities is an entity of a set of entities selected as a function of said at least one second selection criterion from among a plurality of entities meeting said first selection criterion in relation to a second of the first entities.

According to a particular embodiment of the method of data processing, the first vignettes form an ordered series of at least three vignettes from among which the first vignette of the series representing a start entity, the last vignette of the series representing an end entity, and at least one intermediate vignette representing an intermediate entity, an intermediate vignette of the series being linked to a preceding vignette and to a following vignette, the preceding vignette representing the start entity or a preceding intermediate entity and the following vignette representing the end entity or a following intermediate entity, and an intermediate entity is an entity of a set ENp of entities which is obtained by successive selections as a function of said at least one second selection criterion from among a plurality of entities meeting said first selection criterion in relation to the start entity and/or an entity of a set ENq of entities which is obtained by successive selections as a function of said at least one second selection criterion from among a plurality of entities meeting said first selection criterion in relation to the end entity.

According to a particular embodiment of the method of data processing, the entities are artists and the method furthermore comprises a step of constructing a list of pieces of music, said list comprising pieces associated respectively with each entity of the series.

An aspect of the present disclosure also pertains to a device comprising means for generating a signal for control of display on a screen of a graphical interface comprising a graph composed of links and of nodes demarcated by vignettes, each vignette representing an entity, said graph contains a first vignette representing a first entity.

The device comprises a module for selecting a set of entities as a function of at least one second selection criterion, from among a plurality of entities meeting a first selection criterion in relation to the first entity, and the first vignette of said graph is linked in said graph directly to one or more second vignettes each representing a second entity of said set of entities, the number of said second vignettes being dependent on a current threshold value determined on the basis of the plurality of entity.

An aspect of the present disclosure further pertains to a computing program comprising code instructions for the implementation of the steps of a method of data processing such as described above, when they are executed by a processor.

Finally An aspect of the present disclosure pertains to a non-transitory storage medium, readable by a processor, possibly integrated into the processing device, optionally removable, storing a computing program implementing a method of processing such as described above.

BRIEF DESCRIPTION OF THE DRAWINGS

Other characteristics and advantages will be more clearly apparent on reading the following description, given solely by way of non-limiting example, and with reference to the appended drawings in which.

DETAILED DESCRIPTION OF ILLUSTRATIVE EMBODIMENTS

Figure 1:
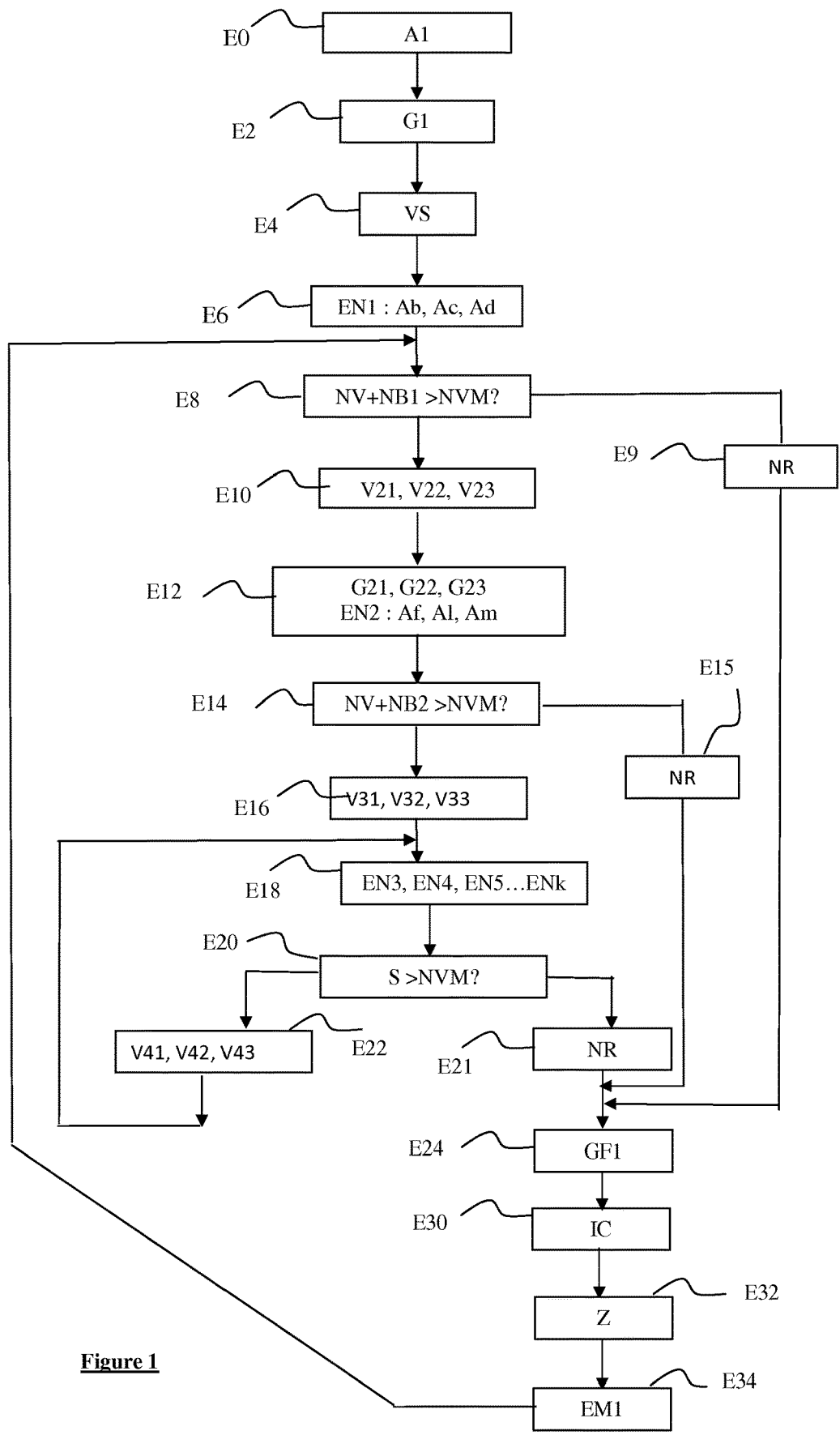
FIG. 1 illustrates in flowchart form a method of data processing according to a first embodiment of the disclosure.

One or more embodiments of the present disclosure is implemented by means of software and/or hardware components. In this regard, the term "module" can correspond in this document either to a software component, or to a hardware component or to a set of hardware and/or software components, able to implement a function or a set of functions, according to what is described hereinbelow in respect of the module concerned.

A software component corresponds to one or more computer programs, one or more subprograms of a program, or more generally to any element of a program or of an item of software. Such a software component is stored in memory and then loaded and executed by a data processor of an apparatus (terminal, server, gateway, set-top-box, router, etc.) and is able to access the hardware resources of this apparatus (memories, recording media, communication bus, electronic input/output cards, user interfaces, etc.).

In the same manner, a hardware component corresponds to any element of a hardware assembly. It may be a programmable hardware component or one with integrated processor for software execution, for example an integrated circuit, a chip card, an electronic card for the execution of firmware, etc.

In the embodiments described, each entity is an artist.

One or more voice contents, for example songs sung by the artist, are associated with each artist.

A number of fans NFi is also associated with each artist Ai. The number of fans represents a quantity, i.e. a characteristic. A number of fans NFi associated with an artist Ai represents a value of this quantity.

A number of fans NFi and one or more song identifiers, for example a title, are recorded in a memory in association with an identifier of each artist Ai.

Other data can also be recorded in association with an artist identifier.

A first selection criterion CR1 and a second selection criterion CR2 are predefined.

The application of a first selection criterion to one or more entities allows the obtaining of a plurality of entities.

The application of a second selection criterion to a plurality of entities makes it possible to determine a set of entities selected from among this plurality of entities.

The second criterion is determined from characteristics of this plurality of entities.

The first criterion CR1 is a criterion making it possible to select one or more entities in relation to one or more entities.

The first criterion CR1 is for example a criterion of proximity between two entities. The proximity between two entities is for example defined as a function of a music genre associated with each artist.

The inter-artist proximity relations are considered to be predefined. For example, one or more values representing a music genre, for example classical, international variety, French song, jazz, etc. are associated during a prior step with each artist.

The application of the first criterion CR1 to an entity, that is to say an artist, makes it possible to determine a plurality of artists of like music genre or of similar music genre.

For example, the application of the first criterion CR1 to an artist, for which the value "French song" has been associated, makes it possible to determine a plurality of artists for which the value "French song" has also been associated.

The first criterion CR1 relates to a relationship between two entities.

The second criterion CR2 is a criterion for comparing a value of a predetermined quantity, for example a number of fans, with a current threshold value VSC.

A quantity represents a characteristic.

For example, the second criterion CR2 makes it possible to select from among a set of entities, all the entities for which the number of fans is greater than a threshold value.

As will be described more precisely in the subsequent description, the threshold value is a value determined as a function of a plurality of entities meeting the first criterion in relation to at least one first entity.

By way of alternative, other first and second criteria are applied in addition to or in replacement for the first criterion CR1 and for the second criterion CR2 which are described here by way of example.

Another example of first criterion is for example "smaller number of fans than that of the entity to which the first criterion is applied".

Another example of second criterion is for example "number of disks sold greater than a threshold value".

By way of alternative, the second criterion comprises two criteria linked by Boolean operators, for example "(number of fans greater than a first threshold value) OR (number of disks sold less than a second threshold value)".

A first embodiment of the method of processing, implemented by a computing device, will now be described with reference to FIGS. 1 to 4.

Such a computing device may typically be, by way of example, a viewing apparatus endowed with tactile functionalities such as a PC screen, a PC tablet, a mobile telephone, or the like. The device might not include any screen. Such may be the case for example for a terminal of Set-Top-Box type, connected on the other hand to a screen, for example of a television set, able to display a graphical interface at the disposal of a user who can actuate for example buttons of a remote control.

FIG. 1 illustrates the various steps of the method of processing according to a first embodiment.

A maximum number of displayed vignettes NVM is predefined.

In practice, the number NVM is chosen in such a way that NVM vignettes are at least in part visible when they are displayed on one and the same screen.

During a step E0, a user inputs by means for example of a user interface, for example a computer mouse, an artist name A1, for example "BRASSENS".

"BRASSENS" represents a first entity A1.

A graph GF1 contains a first vignette V1 representing the first entity A1.

The graph GF1 is a graph composed of links and of nodes demarcated by vignettes.

A number NV of vignettes of the graph GF1 is initialized with the number of first vignettes, that is to say to the value 1 in the embodiment described.

During a step E2, a group G1 of entities is obtained by applying the first criterion CR1 in relation to the first entity A1. Stated otherwise, the entities of the group of entities G1 meet the first criterion CR1 in relation to the first entity A1.

The group G1 constitutes a plurality of entities.

The group G1 comprises for example some hundred artists.

In the embodiment described, the entities of the set EN1 are selected from among a multitude of entities not comprising the first entity A1.

Step E2 is followed by a step E4 during which a current threshold value VSC is determined on the basis of the plurality of entities G1.

The current threshold value VSC is a value of a quantity intervening in the definition of the second criterion CR2, for example the number of fans.

For example, the current threshold value VSC is the smallest value from among the quantity values associated respectively with each entity of the group of entities G1.

Figures 8, 9:
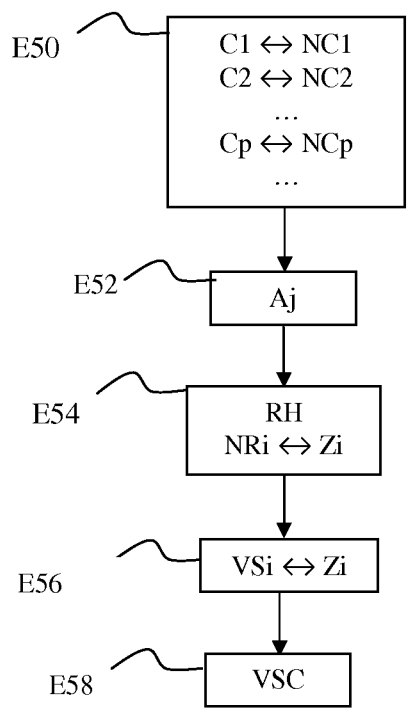
FIG. 8 illustrates in flowchart form steps of determining levels of precision according to an embodiment.
FIG. 9 represents a table containing examples of values associated with classes.

An example of determining the current threshold value VSC is described in the subsequent description with reference to FIG. 8.

During a step E6, a set of entities EN1 is determined by applying the second criterion CR2 to the group of entities G1.

The entities of the set EN1 are selected as a function of the second criterion CR2 from among the entities of the group G1.

The set of entities EN1 comprises one or more entities of the group of entities G1.

In the embodiment described, the application of the second criterion CR2 to the group of entities G1 makes it possible to select the entities of the group G1 for which the associated number of fans is greater than the threshold value VSC.

The set of entities EN1 which is obtained subsequent to the implementation of steps E2 and E6 contains entities selected as a function of the second criterion CR2 from among a plurality of entities meeting the first criterion CR1 in relation to the first entity A1.

The set of entities EN1 comprises for example three entities Ab, Ac, Ad.

During a step E8, the sum of the number NV of vignettes of the graph GF1 and of the number NB1 of elements of the set EN1 is compared with the maximum number NVM of vignettes displayed.

If the sum of the number NV of vignettes of the graph GF1 and of the number NB1 of elements of the set EN1 is less than or equal to the maximum number NVM of vignettes displayed, step E8 is followed by a step E10 during which second vignettes V21, V22, V23 are added to the graph GF1.

The first vignette V1 represents the first entity A1.

The second vignettes V21, V22 and V23 represent respectively the entities Ab, Ac and Ad of the set EN1.

Figure 2:
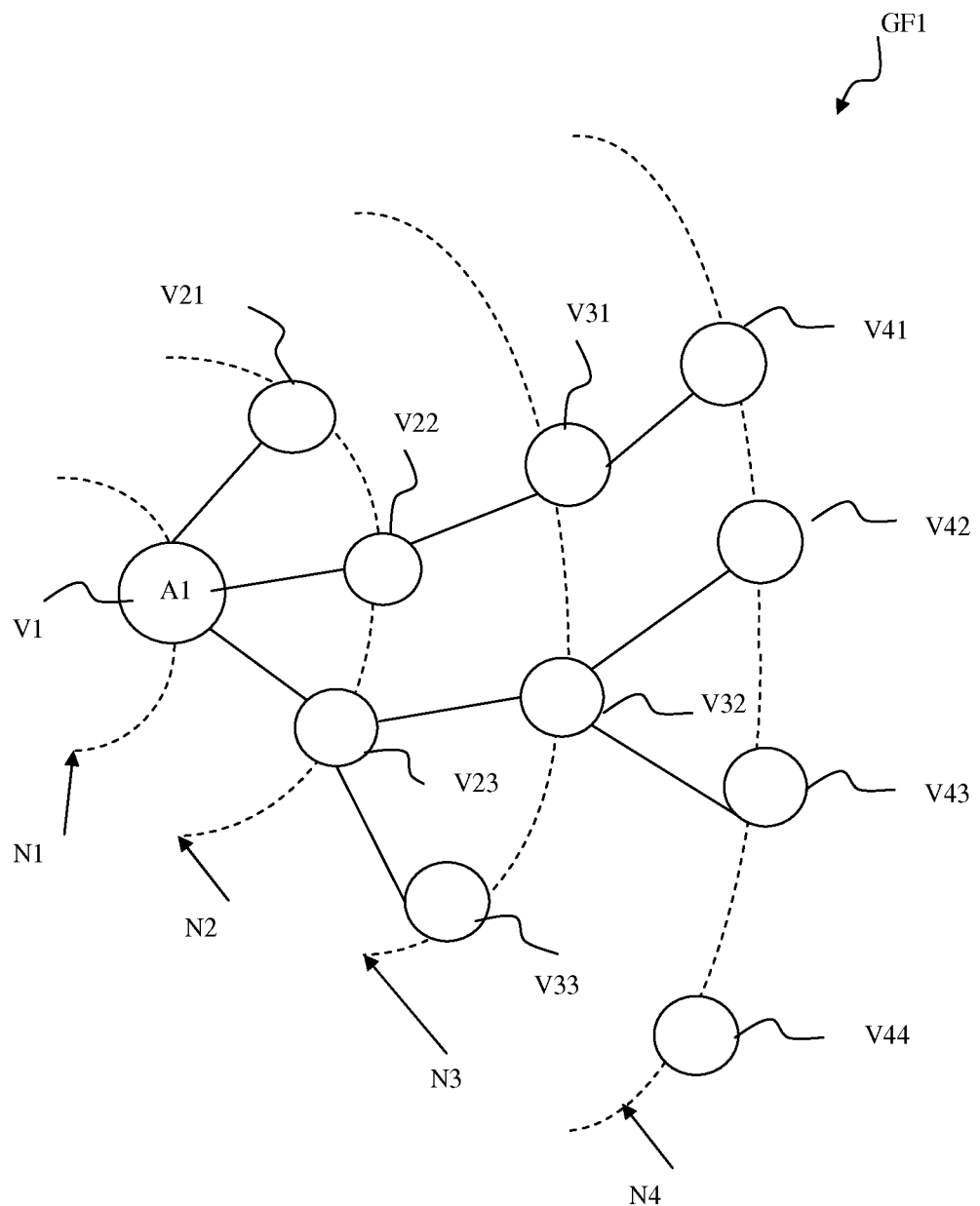
FIG. 2 illustrates a first exemplary graph.

FIG. 2 illustrates an exemplary graph GF1 containing the first vignette V1 and the second vignettes V21, V22 and V23.

The first vignette V1 is linked directly to each second vignette V21, V22 and V23, thus illustrating that the entities Ab, Ac, Ad, represented respectively by the second vignettes V21, V22, V23, have been selected on the basis of the first entity A1 represented by the first vignette V1.

The first vignette V1 belongs to a first level of representation N1 and the second vignettes V21, V22 and V23 belong to a second level of representation N2 of the graph GF1.

In the embodiment described, the graph GF1 contains a second vignette for each entity of the set EN1.

By way of alternative, the graph GF1 contains a second vignette for only some of the entities of the set EN1.

If the sum of the number NV of vignettes of the graph GF1 and of the number NB1 of elements of the set EN1 is greater than the maximum number NVM of vignettes displayed, a number NR of vignettes that remain available is calculated and NR entities are selected from among the entities of the set EN1 determined (step E9).

The NR entities are selected as a function of a third criterion CR3.

For example, the NR entities having the largest number of fans are selected and a vignette is added to the graph GF1 for each of these NR entities.

The set of the NR entities represents a reduced set of entities.

Second vignettes representing respectively entities of the reduced set of entities are added to the graph GF1.

Step E9 is followed by a step E24 of displaying the graph GF1.

Step E10 is followed by a step E12 during which the entities of a set EN2 are selected as a function of the second criterion CR2 from among a plurality of entities meeting the first criterion CR1 in relation to at least one entity of the set EN1.

Stated otherwise, the entities of the set EN2 are selected as a function of the second criterion CR2 from among entities of at least one group of entities, a said group of entities meeting the first criterion CR1 in relation to an entity of the set EN1.

More precisely, one or more groups of entities are obtained. Each group contains entities meeting the first criterion CR1 in relation to an entity of the set EN1.

For example, three groups G21, G22 and G23 are obtained respectively in relation to the entities Ab, Ac and Ad of the set EN1.

In the embodiment described, the groups obtained comprise neither the first entity A1, nor the entities of the set EN1, even if they meet the first criterion CR1 in relation to an entity of the set EN1.

Next, the second set EN2 is obtained by selecting entities from among the entities of the groups of entities G21, G22 and G23 as a function of the second criterion CR2.

For example, the group G21 contains an entity Ae for which the associated number of fans is 200, the group G22 contains an entity Af for which the associated number of fans is 2000, an entity Ag for which the associated number of fans is 500 and an entity Ah for which the associated number of fans is 50 and the group G23 contains an entity Al for which the associated number of fans is 3000 and an entity Am for which the associated number of fans is 1500.

In the case where the current threshold value VSC determined during step E4 is for example equal to 999, the set EN2 comprises 3 entities Af, Al and Am.

During a step E14, the sum S of the number NV of vignettes of the graph GF1 and of the number NB2 of elements of the set EN2 is compared with the maximum number NVM of vignettes displayed. The number NV of vignettes of the graph GF1 is here the sum of the number of first (here, a single vignette) and of the number of second vignettes.

If the sum S is greater than the number NVM, a number NR of vignettes that remain available is calculated and NR entities are selected from among the entities of the set EN2 determined (step E15).

The NR entities are selected as a function of a third criterion CR3.

The set of the NR entities represents a reduced set of entities.

Third vignettes representing respectively entities of the reduced set of entities are added to the graph GF1.

Step E15 is followed by a step E24 of displaying the graph GF1.

If the sum S is less than or equal to the number NVM, third vignettes V31, V32, V33 are added to the graph GF1 during a step E16.

The third vignettes V31, V32 and V33 represent respectively the entities Af, Al and Am of the set EN1.

The graph GF1 illustrated in FIG. 2 contains in addition to the first vignette V1 and the second vignettes V21, V22 and V23, the third vignettes V31, V32 and V33.

At least one second vignette V21, V22 or V23 is linked directly to one or more third vignettes V31, V32 and V33 thus illustrating that the entities Af, Al and Am represented respectively by the third vignettes V31, V32 and V33 have been selected in relation to one of the entities Ab, Ac or Ad represented respectively by the second vignettes V21, V22 and V23.

The third vignettes V31, V32 and V33 belong to a third level of representation N3.

Step E16 is followed by a step E18 of selecting a third set of entities EN3.

The entities of the set EN3 are selected as a function of the second criterion CR2 from among at least one group of entities, a said group of entities meeting the first criterion CR1 in relation to an entity of the set EN2.

Step E18 is similar to step E12.

If the number of entities of a selected set is equal to the value 0, step E18 is followed by step E24.

Otherwise, step E18 is followed by a step E20 during which the sum S of the number NV of vignettes of the graph GF1 and of the number NB3 of elements of the set EN3 is compared with the maximum number NVM of vignettes displayed. The number NV of vignettes of the graph GF1 is here the sum of the number of first (here, a single vignette), of the number of second vignettes and of the number of third vignettes.

If the sum S is greater than the number NVM, a number NR of vignettes that remain available is calculated and then NR entities are selected from among the entities of the determined set EN3 (step E21).

The NR entities are selected as a function of a third criterion CR3.

The set of the NR entities represents a reduced set of entities.

Vignettes representing respectively entities of the reduced set of entities are added to the graph GF1.

Step E21 is followed by a step E24.

If the sum S is less than or equal to the number NVM, fourth vignettes, also called vignettes of level 4 are added to the graph GF1 during a step E22.

Step E22 is followed by a new step E18.

In a particular embodiment where a maximum number of levels has been determined for the graph GF1, step E22 is followed by step E24 if the maximum number of levels is attained for the graph GF1.

Otherwise, step E22 is followed by a new step E18.

Step E18 can be repeated several times by recursivity thus allowing the successive obtaining of sets of entities EN4, EN5 . . . .

Generally, a set ENk is obtained after the obtaining of a set ENk−1.

The entities of the set ENk are selected as a function of the second criterion CR2 from among a plurality of entities meeting the first criterion CR1 in relation to at least one entity of the set ENk−1.

The entities of the set ENk are selected as a function of the second criterion CR2 from among entities of at least one group of entities, a said group of entities meeting the first criterion CR1 in relation to an entity of the set ENk−1.

At least one vignette of level (k−1) is linked directly to one or more vignettes of level K thus illustrating that the entities represented respectively by the vignettes of level K have been selected on the basis of one of the entities represented respectively by the vignettes of level K−1.

The process stops when the maximum number NVM of vignettes of the graph GF1 is attained.

The process also stops when a set of entities which is determined for a considered level of representation does not contain any element. In this case, the number of vignettes of the graph may be less than the maximum number of vignettes that can be displayed.

During a step E24, the graph GF1 is displayed.

Step E24 is a step of generating a signal for control of display on a screen of a graphical interface containing the graph GF1.

In the embodiment described, the vignettes are displayed after selection of all the sets.

By way of alternative, the vignettes representing a set of entities for a level of representation are displayed subsequent to the determination of this set and before the determination of the entity set for a following level of representation.

In the embodiment described, the groups of entities meeting the first criterion in relation to an entity of a set of entities comprise neither the first entity A1, nor the entities of the set or sets of entities selected previously even if the latter meet the first criterion CR1 in relation to an entity of the set.

Likewise, in this embodiment, one and the same entity belonging on the one hand to a first group of entities meeting the first criterion in relation to an entity of a set and on the other hand, to a second group of entities meeting the first criterion in relation to another entity of said set, is selected only once as a function of the second criterion CR2.

Stated otherwise, an entity selected as a function of the second criterion from among the entities of the first group is not selected as a function of the second criterion CR2 from among the entities of the second group even if it satisfies the conditions of the second criterion CR2.

In this embodiment, a vignette of level k is therefore linked to a single vignette of level (k−1).

During a step E30, an icon IC representing for example a cursor is displayed. The icon comprises at least two areas selectable by a user by means of a user interface, for example a computer mouse. Each displayed area corresponds to a threshold value VS for the criterion CR2.

An example of carrying out steps allowing the determination of the number of selectable areas displayed and of a threshold value VS associated with each area is described in the subsequent description with reference to FIG. 8.

During a step E32, the user selects an area Z from among the areas of the displayed icon IC.

The selection of one of the areas of the icon by the user triggers the assigning for the current threshold value VSC, of the threshold value associated with the area selected for the current threshold value VS.

The current threshold value VSC is unchanged if the threshold value associated with the selected area is the current threshold value.

Otherwise, the current threshold value VSC is modified. It is then replaced with the threshold value associated with the selected area.

The modification of the threshold value entails the modification of the second criterion CR2.

By way of alternative, values corresponding respectively to threshold values predetermined as a function of the plurality of entities G1 obtained during step E2 are displayed and a value is selected from among these values by a user by means of a user interface.

Step E32 is followed by a step E34 during which a set of entities EM1 is selected as a function of the second criterion CR2, from among a plurality of entities meeting the first selection criterion in relation to the first entity A1.

The threshold value having changed, the set of entities EM1 may be different from the set of entities EN1.

Modification of the threshold value makes it possible to increase or to decrease the number of entities of the selected set.

Step E34 is followed by steps E8 to E30 described previously.

Figure 3:
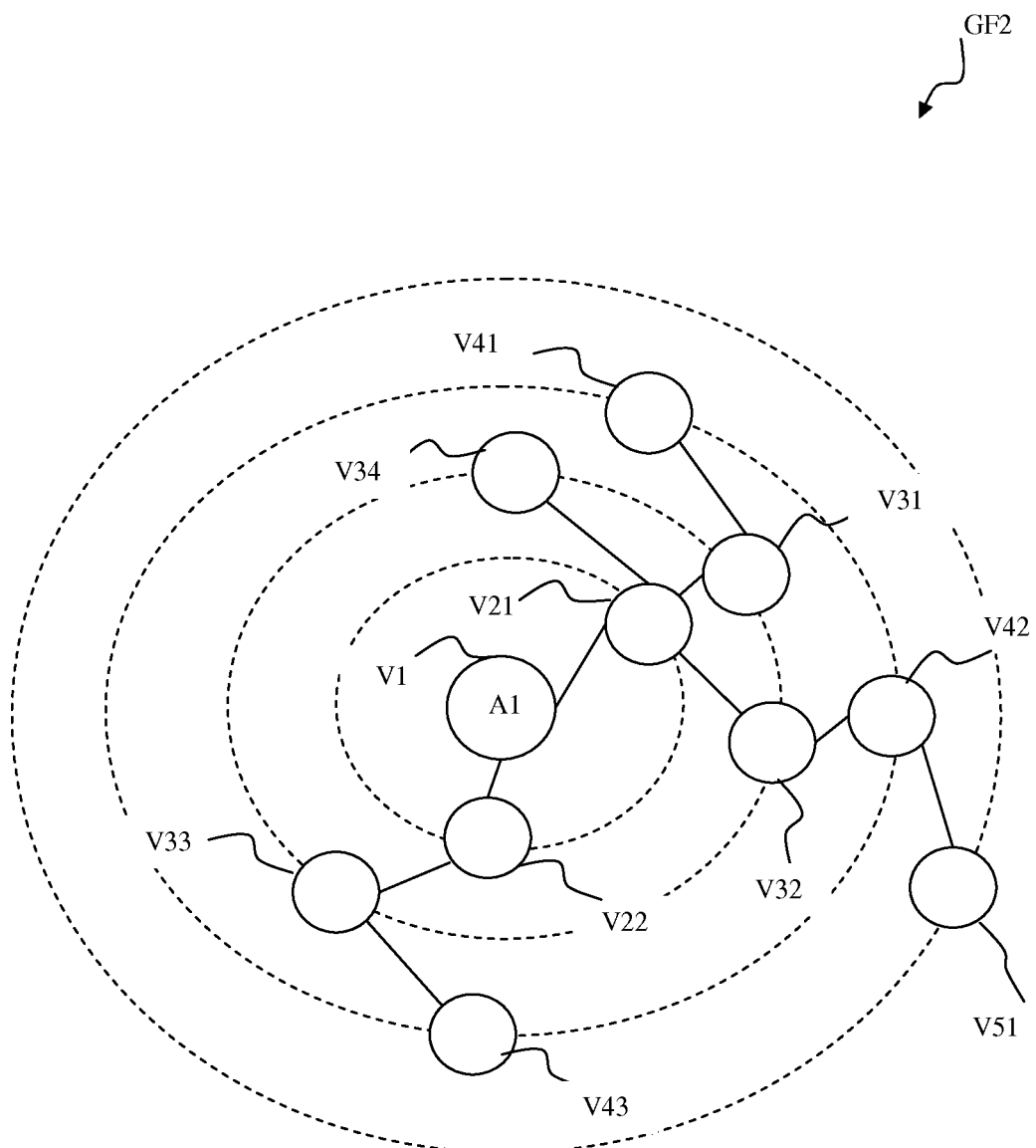
FIG. 3 illustrates a second exemplary graph.
Figure 4:
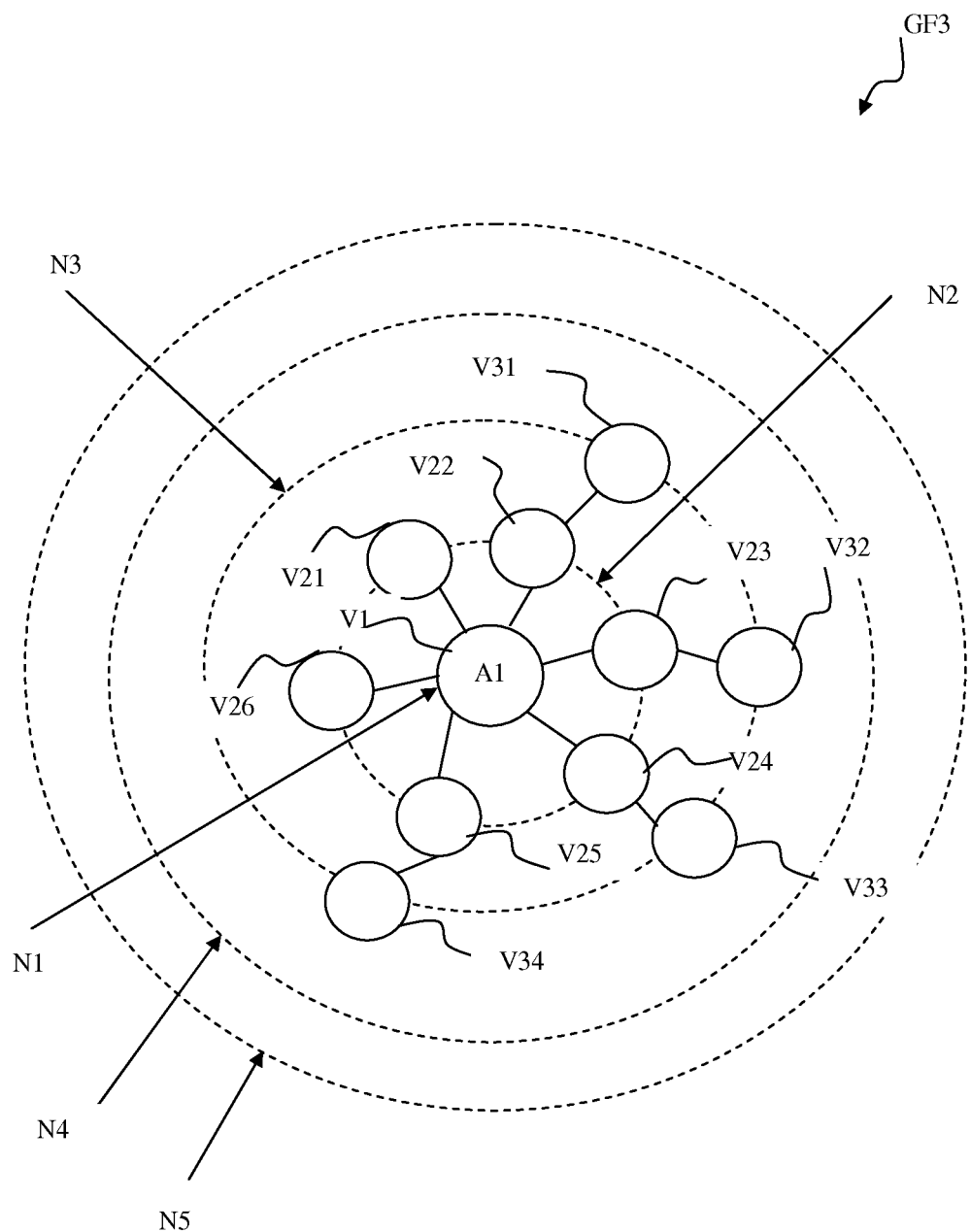
FIG. 4 illustrates a third exemplary graph.

FIG. 3 illustrates a graph GF2 obtained for a first threshold value and FIG. 4 illustrates a graph GF3 obtained for a second threshold value.

A second embodiment of the method of processing will now be described with reference to FIGS. 5 to 7.

Figure 5:
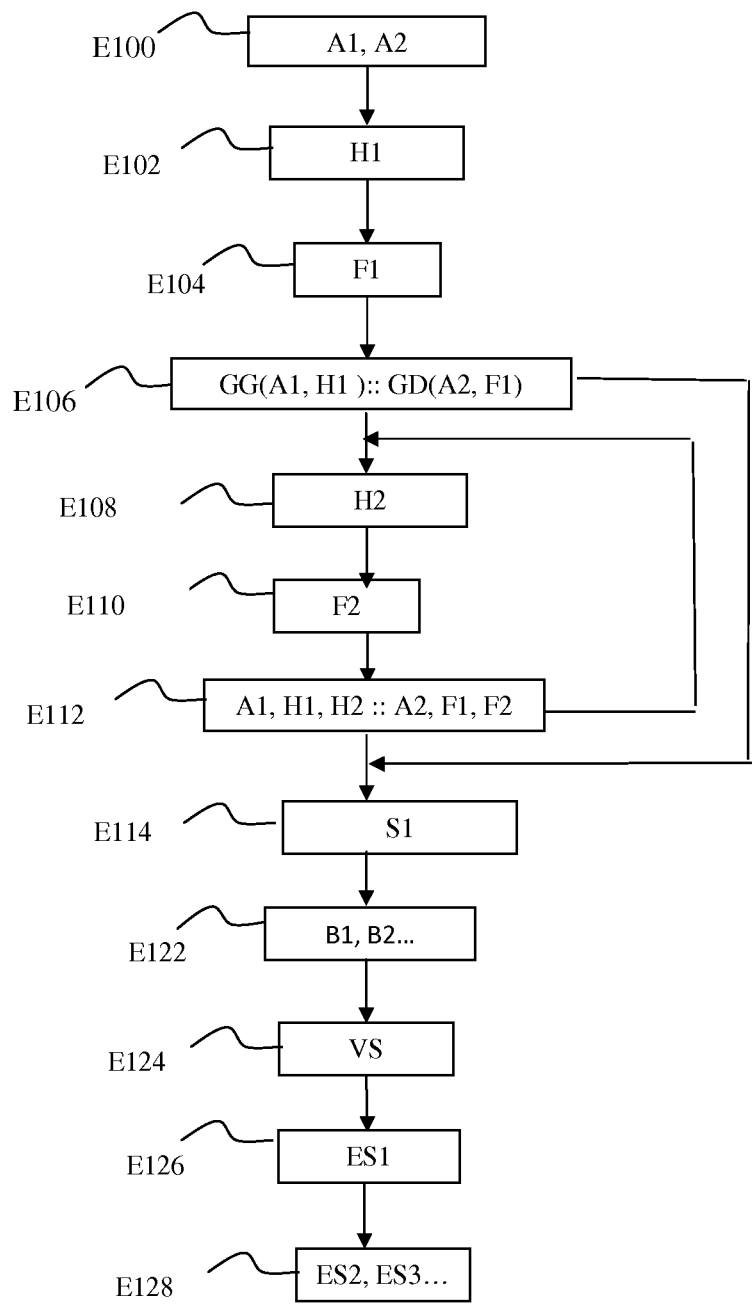
FIG. 5 illustrates in flowchart form a method of data processing according to a second embodiment of the disclosure.

With reference to FIG. 5, during a step E100, a user inputs by means for example of a user interface, a first artist name A1 and a second artist name A2.

The first name input is for example "BRASSENS".

The second name input is for example "PINK FLOYD".

"BRASSENS" and "PINK FLOYD" represent respectively a first entity A1 and a first entity A2.

"BRASSENS" represents a start entity. "PINK FLOYD" represents an end entity.

During a step E102, a set H1 of entities is selected as a function of the second criterion CR2, from among a plurality of entities meeting the first selection criterion CR1 in relation to the start entity A1.

During a step E104, a set F1 of entities is selected as a function of the second criterion CR2, from among a plurality of entities meeting the first selection criterion CR1 in relation to the end entity A2.

During a step E106, we determine whether the entity A1 or an entity of the set H1 is an entity of the set F2 or the entity A2, that is to say we determine whether there exists an entity common to a group GG containing the entity A1 and the entities of the set H1 and to a group GD containing the entity A2 and the entities of the set F1.

If an entity is common, step E106 is followed by a step E114.

Otherwise, during a step E108, a set H2 of entities is obtained. The entities of the set H2 are selected as a function of the second criterion CR2 from among the entities of at least one group of entities, the entities of a said group meeting the first criterion CR1 in relation to an entity of the set H1.

During a step E110, a set F2 of entities is obtained. The entities of the set F2 are selected as a function of the second criterion CR2 from among the entities of at least one group of entities, the entities of a said group meeting the first criterion CR1 in relation to an entity of the set F1.

During a step E112, we determine whether the entity A1, an entity of the set H1 or an entity of the set H2 is an entity of the set F2, an entity of the set F1 or the entity A2.

If no common entity exists, steps E108 to E112 are repeated so as to successively obtain sets H3, H4 ... and sets F3, F4 and to determine whether a common entity exists.

If an entity, for example the entity Ax, is common, an ordered series S1 of entities is determined during a step E114.

The first entity of the series S1 is the start entity Ax. The last entity of the series S1 is the end entity A2.

The series also comprises the common entity Ax.

It optionally comprises between the entity A1 and the entity Ax, one or more preceding intermediate entities.

In the particular case where the common entity Ax is the start entity A1 or the end entity A2, the ordered series S1 comprises solely the entity A1 and the entity A2.

Otherwise, the ordered series S1 optionally comprises between the entity Ax and the entity A2, one or more following intermediate entities.

The common entity Ax belongs for example to a set Hp or is the start entity A1.

The common entity Ax belongs for example to a set Fq or is the end entity A2.

The entities of the series S1 are then successively the start entity A1, an entity of the set H1, an entity of the set H2 ... an entity of the set $H_{p-1}$, the common entity Ax, an entity of the set $F_{q+1}$, ... an entity of the set F2, an entity of the set F1 and the end entity A2.

Figure 6:
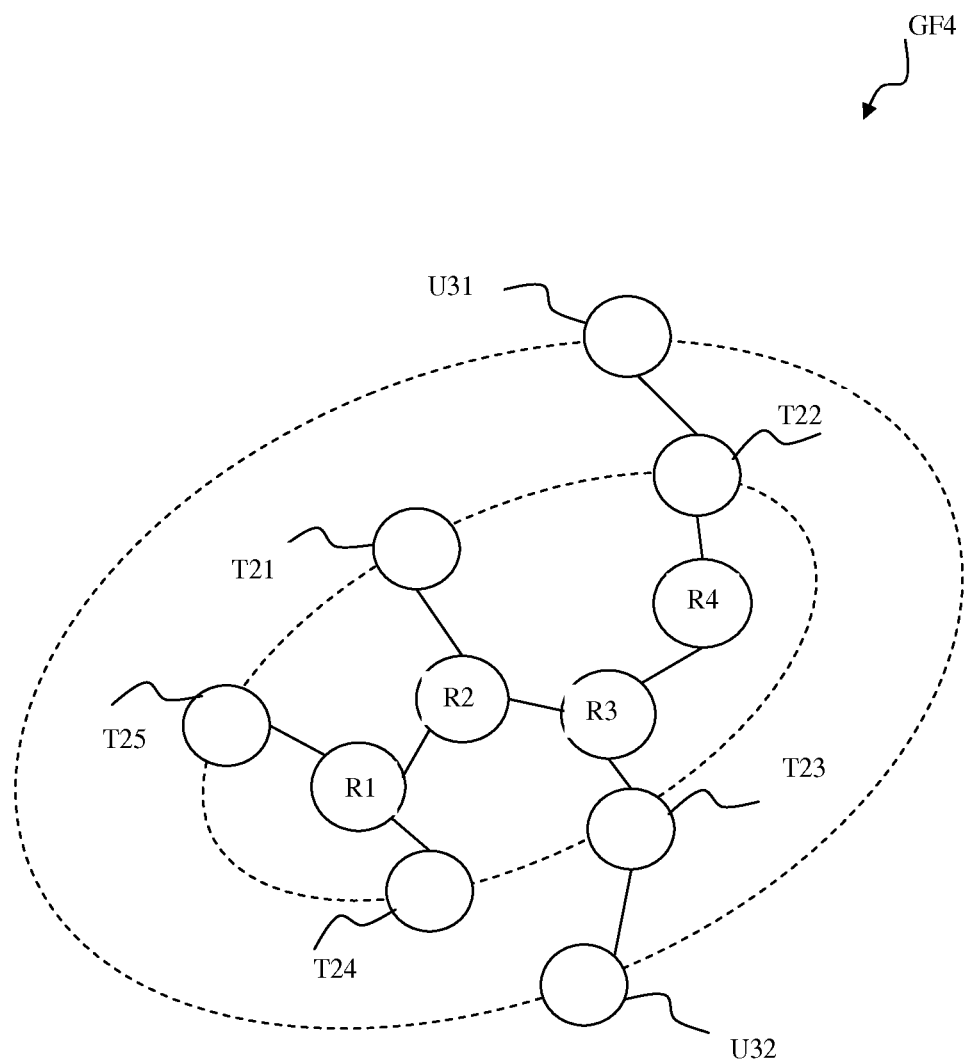
FIG. 6 illustrates a fourth exemplary graph.

FIG. 6 illustrates a graph GF4 containing vignettes R1, R2, R3, R4 representing respectively the entities of the series S1.

The vignette R1 representing the start entity A1 is linked to the vignette R4 representing the end entity A2, by way of the vignettes R2 and R3 representing intermediate entities.

The entities of the series S1 represent first entities.

In the particular case where several common entities exist, several ordered series are determined.

The ordered series S1 is thereafter selected from among the various series determined either as a function of a predetermined criterion or by a user by means of a user interface.

Next, during a step E122, groups of entities B1, B2 ... Bi ... are obtained respectively for each entity of the series S1.

A group of entities Bi is obtained by applying the first criterion CR1 in relation to an entity Ai of the series S1. The entities of each group Bi meet the first criterion CR1 in relation to one of the entities of the series S1.

The entities of the groups B1, B2 ... constitute a plurality of entities.

Step E122 is followed by a step E124 during which a current threshold value VS is determined on the basis of the entities of the groups B1, B2 ... Bi ... obtained.

An example of determining the current threshold value VS is described in the subsequent description with reference to FIG. 8.

During a step E126, a set ES1 is obtained by selecting entities from among the entities of the groups of entities B1, B2 ... Bi ... as a function of the second criterion CR2.

One or more sets ES2, ES3 ... may thereafter be determined successively on the basis of the set of entities ES1 (step E128).

The determination of a set ESk of rank k in relation to a set of entities $ES_{k-1}$ of rank (k−1) is for example performed as described in the embodiment described previously.

The graph GF4 illustrated in FIG. 6 contains the four first vignettes R1, R2, R3 and R4. It also contains several second vignettes T21 to T25 representing respectively entities of the set of entities ES1 and third vignettes U31 and U32 representing respectively entities of the set of entities ES2.

At least one first vignette R1, R2, R3, R4 is linked directly to one or more second vignettes T21, T22 ....

The first vignettes are displayed on a first level of representation N1.

The second vignettes T21, T22 ... are displayed on a second level of representation N2.

The third vignettes U31 and U32 are displayed on a third level of representation N3.

In a particular embodiment, a list of pieces of music or of songs is compiled on the basis of the graph obtained.

The list comprises for example a song associated with each first entity represented by a first vignette.

As a variant, an icon representing a cursor containing several selectable areas is displayed and the user can obtain, subsequent to the selection of an area, a second graph containing the vignettes R1, R2, R3 and R4 and a different number of second vignettes from that of the previously displayed graph GF4.

In the embodiment described, the first entities are the entities of an ordered series.

In a variant of the embodiment, the first entities are entities chosen by a user, by means for example of a user interface.

Figure 7:
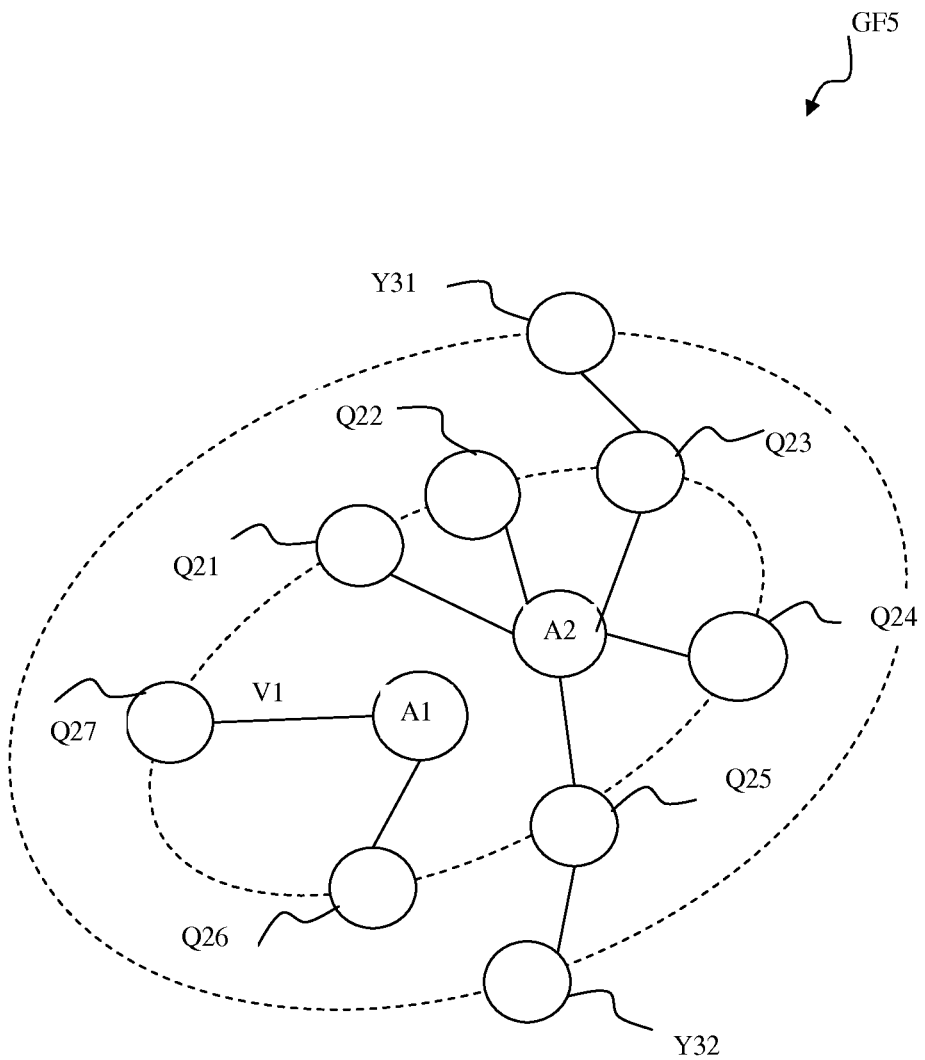
FIG. 7 is a fifth exemplary graph.

FIG. 7 illustrates a graph GF5 containing two first vignettes V1 and V2 representing respectively two entities A1 and A2 chosen by a user. The graph GF5 also contains second vignettes T21 to T27 and third vignettes U31 and U32. Each second vignette represents an entity determined in relation to one of the first vignettes. Each third vignette represents an entity determined in relation to a second vignette Each first vignette is linked directly to one or more second vignettes.

At least one second vignette is linked directly to one or more third vignettes.

An example of determining threshold values on the basis of a set EN of entities is now described with reference to FIGS. 8 and 9.

A set of classes is predefined for a quantity considered, for example the quantity "number of fans". These classes make it possible to group entities together as a function of the values of the quantity "number of fans" that are associated with these entities.

The set of classes is an ordered set.

A class Ci of said set is for example defined by a minimum value CTi of the quantity "number of fans" and by a maximum value CMi of the quantity "number of fans".

The classes are for example defined as a function of a predetermined increment and of a predetermined scale factor.

FIG. 9 illustrates an example of minimum values and maximum values obtained for classes C1, C2 ... defined as a function of an increment of 10 and of a scale factor equal to 2.

By way of alternative, each class is defined by a minimum value and by a maximum value of the quantity "number of fans" which are such that the difference between these two values is equal to a predetermined number, for example 999.

During a step E50, each entity of the set EN is associated with one of the classes.

Each class C1, C2 ... Cp ... thus groups together NC1, NC2 ... NCp ... elements of the set EN considered.

During a step E52, that entity Aj of the set EN for which the value VAj of the quantity "number of fans" is the highest among the entities of the set EN is selected.

During a step E54, a maximum rank RH is determined. The maximum rank RH is the rank of the class to which the entity Aj selected during step E52 belongs.

If the maximum rank RH is greater than or equal to 2, a number of determined areas NBZ corresponds to the maximum rank RH, otherwise the number of areas NBZ is fixed at the value 2. Thus the number of areas NBZ is always at least equal to the value 2.

An order number NRi is associated with each area Zi.

During a step E56, a threshold value VSi is associated with each area Zi.

The threshold value VSi associated with an area of order i is for example the minimum value CTi of the quantity "number of fans" defined for the class Ci.

The threshold value VS1 associated with the first area Z1 is for example the value CT1, for example the value 0.

The threshold value VS2 associated with the second area Z2 is for example the value CT2.

During a step E58, a current threshold value VSC is determined.

The current threshold value VSC is a threshold value used before selection of an area Zi by the user.

The current threshold value VSC is for example the minimum value CTj of the quantity "number of fans" of a class Cj such that the class Cj is for example the class of immediately lower order than the class Ca associated with the first entity A1.

For example, if the first entity A1 belongs to the class C4, the current threshold value VSC determined is CT3.

Thus in the case described where the criterion CR2 allows the selection of the artists for which the number of fans is greater than a current threshold value VSC, the choice of the value CT3 when the first entity A1 belongs to the class C4 allows the display of vignettes representing artists of the classes of rank greater than 3.

In the case where the class Cj of immediately lower order than the class Ca is not a retained class, the current threshold value VSC is for example the minimum value CTj of the quantity "number of fans" of the class of maximum rank RH.

In the case where the set of entities meeting the first criterion CR1 in relation to the first entity A1 does not comprise any entities, the current threshold value VSC is for example fixed at the value 0.

In the case where several first entities exist, that is to say several first artists, the current threshold value VSC is for example the minimum value CTj of the quantity "number of fans" of a class Cj such that the class Cj is for example the class of immediately lower order than the class Cb of smallest rank from among the ranks of the classes associated respectively with the first entities.

In the embodiments described, the entities are artists.

By way of alternative, the entities can be names of files, contents, etc.

Figure 10:
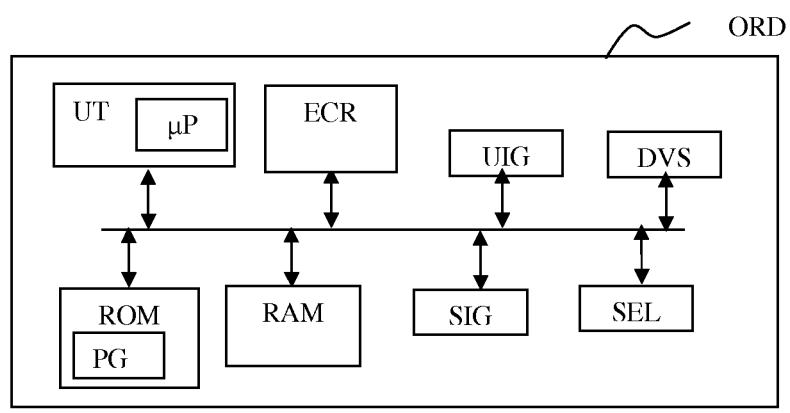
FIG. 10 is a diagram illustrating a device able to carry out the steps of a method of data processing according to an embodiment.

According to a chosen embodiment represented in FIG. 10, a device implementing a method of processing according to an exemplary embodiment is for example a computer ORD which comprises in a known manner, in particular a processing unit UT equipped with a microprocessor, a read-only memory of ROM or EEPROM type, a random-access memory of RAM type.

This device also comprises a screen ECR, graphical interface means UIG, for example a computer mouse.

This device ORD comprises a module SIG for generating a signal for control of display a module DVS for determining a threshold value and a selection module SEL.

The selection module SEL is able to select a set of entities as a function of at least one second criterion, from among a plurality of entities meeting a first selection criterion in relation to a first entity.

The module for determining a threshold value DVS is able to determine a current threshold value on the basis of the plurality of entity.

The module SIG for generating a signal for control of display is able to generate a signal for control of display on the screen ECR of a graphical interface comprising a graph composed of links and of nodes demarcated by vignettes, each vignette representing an entity. Said graph contains a first vignette representing a first entity linked directly to one or more second vignettes each representing a second entity of said set of entities, the number of said second vignettes being dependent on the current threshold value determined on the basis of the plurality of entity.

The EEPROM read-only memory contains a computer program PG comprising program instructions suitable for carrying out the steps of a method of processing according to the one or more embodiments of the disclosure.

Upon power-up, the program PG stored in the memory of EEPROM type is transferred into the random-access memory which will then contain an executable code as well as registers for storing the variables necessary for the implementation of a step of selecting a set of entities as a function of at least one second criterion, from among a plurality of entities meeting a first selection criterion in relation to the first entity and a step of generating a signal for control of display on a screen of a graphical interface comprising a graph composed of links and of nodes demarcated by vignettes, each vignette representing an entity, said graph containing a first vignette representing a first entity, linked in said graph directly to one or more second vignettes each representing a second entity of said set of entities, the number of said second vignettes being dependent on a current threshold value determined on the basis of the plurality of entity.

More generally a non-transitory, hardware storage medium, readable by a computer or by a microprocessor, possibly integrated into the device, optionally removable, stores a program implementing the steps of a control method, according to the one or more embodiments of the disclosure. A non-transitory storage medium indicates a medium that does not cover solely a transitory signal.

Although the present disclosure has been described with reference to one or more examples, workers skilled in the art will recognize that changes may be made in form and detail without departing from the scope of the disclosure and/or the appended claims.

What is claimed is:

1. A method of data processing, implemented by a computing device comprising:
    a step of generating a signal for control of display on a screen of a graphical interface comprising a graph composed of links and of nodes demarcated by vignettes, each vignette representing an entity, said graph comprising a first vignette representing a first entity,
    a step of selecting a plurality of entities meeting a first criterion related to the first entity,
    a step of selecting a set of entities as a function of at least one second selection criterion, from among the plurality of entities meeting, and
    determining at least one threshold value from characteristics of the entities of the plurality of entities,
    wherein:
        the first vignette of said graph is linked in said graph directly to one or more second vignettes, each representing an entity of said set of entities,
        at least one entity being associated with at least one characteristic and a characteristic value being associated with the characteristic,
        the second selection criterion depends on a current threshold value, which is one of the at least one determined threshold value, said current threshold value being a value of the characteristic and the second selection criterion is a criterion of comparison between said current threshold value and the characteristic value of an entity of the plurality of entities,
        the graphical interface including an icon comprising at least two areas selectable by a user, each area being associated with a threshold value, at least one of said associated threshold value being one of the at least one determined threshold value, and
        the method comprises, in response to a selection by a user of one of said at least two areas of the icon, obtaining a second set of entities by application of the second selection criteria in which the current threshold value is replaced by the threshold value associated with the selected area.

2. The method of data processing according to claim 1 in which said graph contains a plurality of vignettes distributed over two levels, the first vignette belonging to a first level and the second vignettes being distributed over a second level,
    wherein the step of selecting comprises selecting N sets of entities, N being greater than or equal to one, which comprises:
    selecting a second set of entities performed as a function of said at least one second criterion, from among entities of at least one group of entities, the entities of a said group of entities meeting said at least one first selection criterion in relation to an entity of said set, and
    selecting a Kth set of entities, where K>2, performed as a function of said at least one second criterion, from among entities of at least one group of entities, the entities of a said group of entities meeting said at least one first selection criterion in relation to an entity of the (K−1)th set, wherein a vignette of the level (k−1) of said graph is linked in said graph directly to one or more vignettes of level K each representing an entity of said Kth set of entities, the number of said vignettes of level K being dependent on said second criterion.

3. The method of processing according to claim 2, in which the selection of a Kth set furthermore comprises a test step to determine whether the sum of the number NV of vignettes of order strictly less than K of said graph and of the number NK of entities of the Kth set is greater than a predefined maximum value NVM, and in the case where said sum is greater than said maximum value NVM, a step of determining a reduced set of entities comprising (NVM−NV) entities selected from among the NK entities of the Kth set, each vignette of level K representing an entity of said reduced set.

4. The method of data processing according to claim 1, wherein determining the current threshold value comprises selecting the current threshold value from among several threshold values determined as a function of said plurality of entities.

5. The method of data processing according to claim 1, in which the step of selecting said area is followed by a step of displaying a modified graph containing a modified number of said second vignettes.

6. The method of data processing according to claim 1, in which the number of areas and the threshold value associated with each area are determined on the basis of said plurality.

7. The method of data processing according to claim 1, in which a plurality of classes being predefined for a predefined quantity, a rank being associated with each class, each entity of the plurality of entities is associated with one of the classes as a function of the value of the quantity associated with said entity and the number of areas depends on the highest rank from among the ranks of the classes for which at least one entity of the plurality has been associated.

8. The method of data processing according to claim 7, in which the number of areas is the number of classes for which at least one entity of the plurality has been associated.

9. The method of data processing according to claim 1, in which the graph comprises at least two first vignettes each representing a first entity and in which the method comprises:

a step of obtaining a set of entities of rank 1 which are selected as a function of said at least one second selection criterion from among entities of at least two groups of entities, the entities of a said group meeting said at least one first selection criterion in relation to one of the first entities, wherein each first vignette of said graph is linked in said graph directly to one or more second vignettes each representing an entity of said set of entities of rank 1, the number of said second vignettes being dependent on a threshold value determined on the basis of entities of said at least two groups of entities.

10. The method of data processing according to claim 9, in which the graph contains two first entities and in which a first of the two first entities is an entity of a set of entities selected as a function of said at least one second selection criterion from among a plurality of entities meeting said first selection criterion in relation to a second of the first entities.

11. The method of data processing according to claim 9, in which the first vignettes form an ordered series of at least three vignettes from among which the first vignette of the series representing a start entity, the last vignette of the series representing an end entity, and at least one intermediate vignette representing an intermediate entity, an intermediate vignette of the series being linked to a preceding vignette and to a following vignette, the preceding vignette representing the start entity or a preceding intermediate entity and the following vignette representing the end entity or a following intermediate entity, and in which an intermediate entity is an entity of a set of entities which is obtained by successive selections as a function of said at least one second selection criterion from among a plurality of entities meeting said first selection criterion in relation to the start entity and/or an entity of a set of entities which is obtained by successive selections as a function of said at least one second selection criterion from among a plurality of entities meeting said first selection criterion in relation to the end entity.

12. The method of data processing according to claim 11, in which the entities are artists and the method furthermore comprises a step of constructing a list of pieces of music, said list comprising pieces associated respectively with each entity of the series.

13. The method according to claim 1, wherein the second selection criteria comprises a comparison between a characteristic value associated with each entity with a threshold value, and said at least one determined threshold value is determined from the characteristics values of the plurality of entities.

14. A device comprising:

means for generating a signal for control of display on a screen of a graphical interface comprising:

a graph composed of links and of nodes demarcated by vignettes, each vignette representing an entity, wherein said graph contains a first vignette representing a first entity, and a module configured to select a plurality of entities meeting a first criterion related to the first entity, select a set of entities from among the plurality of entities as a function of at least one second selection criterion, and determine at least one threshold value from characteristics of the entities, wherein:

the first vignette of said graph is linked in said graph directly to one or more second vignettes each representing an entity of said set of entities, at least one entity being associated with at least one characteristic and a characteristic value being associated with the characteristic, the second selection criterion depends on a current threshold value, which is one of the at least one determined threshold value, said current threshold value being a value of the characteristic and the second selection criterion is a criterion of comparison between said current threshold value and the characteristic value of an entity of the plurality of entities, the graphical interface including an icon comprising at least two areas selectable by a user, each area being associated with a threshold value, at least one of said associated threshold value being one of the at least one determined threshold value, and the module, in response to a selection by a user of one of said at least two areas of the icon, obtains a second set of entities by application of the second selection criteria in which the current threshold value is replaced by the threshold value associated with the selected area.

15. The device according to claim 14, wherein the second selection criteria comprises a comparison between a characteristic value associated with each entity with a threshold value, and said at least one determined threshold value is determined from the characteristics values of the plurality of entities.

16. A non-transitory storage medium readable by a processor and storing a computing program, which when executed by the processor configure the processor to implement a method of data processing, the method comprising:
 generating a signal for control of display on a screen of a graphical interface comprising a graph composed of links and of nodes demarcated by vignettes, each vignette representing an entity, said graph comprising a first vignette representing a first entity,
 selecting a plurality of entities meeting a first criterion related to the first entity,
 selecting a set of entities as a function of at least one second selection criterion, from among the plurality of entities, and
 determining at least one threshold value from characteristics of the entities of the plurality of entities,
 wherein:
  the first vignette of said graph is linked in said graph directly to one or more second vignettes, each representing an entity of said set of entities,
  at least one entity being associated with at least one characteristic and a characteristic value being associated with the characteristic,
  the second selection criterion depends on a current threshold value, which is one of the at least one determined threshold value, said current threshold value being a value of the characteristic and the second selection criterion is a criterion of comparison between said current threshold value and the characteristic value of an entity of the plurality of entities,
  the graphical interface including an icon comprising at least two areas selectable by a user, each area being associated with a threshold value, at least one of said associated threshold value being one of the at least one determined threshold value, and
  the method comprises, in response to a selection by a user of one of said at least two areas of the icon, obtaining a second set of entities by application of the second selection criteria in which the current threshold value is replaced by the threshold value associated with the selected area.

17. The method according to claim 16, wherein the second selection criteria comprises a comparison between a characteristic value associated with each entity with a threshold value, and said at least one determined threshold value is determined from the characteristics values of the plurality of entities.

* * * * *